United States Patent [19]

Teramachi

[11] Patent Number: 4,553,793
[45] Date of Patent: Nov. 19, 1985

[54] RECIRCULATING-BALL LINEAR BEARING WITH A GUIDE RAIL

[76] Inventor: Hiroshi Teramachi, 2-34-8, Higashi-Tamagawa, Setagaya-Ku, Tokyo, Japan

[21] Appl. No.: 471,736

[22] Filed: Mar. 3, 1983

[30] Foreign Application Priority Data

Mar. 16, 1982 [JP] Japan .................................. 57-41241

[51] Int. Cl.$^4$ ............................................. F16C 29/06
[52] U.S. Cl. ..................................... 308/6 C; 308/6 R
[58] Field of Search ............... 308/6 C, 3 A, 3 R, 6 R

[56] References Cited

U.S. PATENT DOCUMENTS

| | | | |
|---|---|---|---|
| 3,008,774 | 11/1961 | Morris et al. | 308/6 C X |
| 4,273,389 | 6/1981 | Takai | 308/6 C |
| 4,304,443 | 12/1981 | Hoffmann | 308/6 C |
| 4,376,557 | 3/1983 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

Apparatus comprising a pair of guide rails and at least one pair of recirculating-ball linear bearing assemblies, for use in frictionlessly moving a table or like object of inverted-U-shaped cross section along a rectilinear support. Rigidly mounted to the opposite sides of the support, the guide rails have each a pair of divergent surfaces each having formed thereon a ball raceway extending longitudinally of the guide rail. The linear bearing assemblies are affixed to the opposed inside surfaces of the table or the like. Each bearing assembly includes a bearing body having a pair of convergent surfaces having formed thereon a pair of ball raceways opposed to the respective raceways on one guide rail. Each bearing body also has two ball return passageways extending longitudinally therethrough. Fastened to the opposite ends of each bearing body, a pair of end covers have formed therein hairpin grooves each intercommunicating one raceway on the bearing body and one return passageway therein to allow recirculation of a group of antifriction balls. A cage guides the groups of balls as they roll between the raceways on each bearing body and the raceways on the opposed guide rail. As viewed cross-sectionally, the raceways on the guide rails and on the bearing bodies are each curved with a radius approximately equal to the radius of each antifriction ball.

9 Claims, 11 Drawing Figures

RECIRCULATING-BALL LINEAR BEARING WITH A GUIDE RAIL

BACKGROUND OF THE INVENTION

This invention relates to linear bearing apparatus for use in moving an object along a rectilinear path with a minimum of friction. More specifically the invention pertains to the combination of a linear bearing assembly and a guide rail therefor, with the linear bearing assembly being of the type incorporating groups of recirculating antifriction balls. The invention also specifically concerns apparatus comprising at least one pair of such recirculating-ball linear bearing assemblies and a pair of guide rails, so constructed and arranged that the direction of action of the load transmitted to the apparatus can be either downward, upward, or opposite lateral directions.

Linear bearings with rolling antifriction balls are finding ever-increasing applications in machine tools and a variety of other pieces of machinery or equipment wherein one part is to be frictionlessly moved back and forth relative to another. As heretofore constructed, however, the linear ball bearings have had drawbacks in connection with the contours of the surfaces defining the ball paths between the bearings and the guide rails. Typical conventional ball paths are, as viewed cross-sectionally, each delineated by four circular arcs arranged like two Gothic arches placed opposite to each other. Each antifriction ball makes contact with the bounding surfaces at four points. This cross-sectional shape of the bottom ball paths is objectionable because of the almost unavoidable slip or spin of the balls under load, giving rise to considerable frictional resistance and uneven wear and so shortening the useful life of the linear bearings.

Additionally, being in contact with the bounding surfaces each at four points, the antifriction balls cannot possibly take up the machining or mounting errors of the other parts of the linear bearings and of the guide rails. For the smooth rolling of the balls, therefore, it has been necessary to machine the parts to the most stringent dimensional tolerances and to mount them in exact positions on other parts of high rigidity which are themselves machined to very close tolerances.

SUMMARY OF THE INVENTION

The present invention seeks to provide improved recirculating-ball linear bearing apparatus designed to make it possible for a table or other object to travel frictionlessly back and forth over any distance along a rectilinear support, and to withstand the load acting thereon in any direction.

The invention also seeks to assure satisfactory performance of the apparatus despite possible dimensional or mounting errors of its components.

The invention also seeks to eliminate the slip or spin of the recirculating antifriction balls under load.

The invention also seeks to make the apparatus readily adaptable for use with tables or other objects and rectilinear supports therefor of varying widths.

In its simplest form the apparatus in accordance with the invention comprises a guide rail and a recirculating-ball linear bearing assembly in rolling engagement therewith. The guide rail has a pair of divergent surfaces formed longitudinally thereon, with each surface having a ball raceway of arcuate cross section extending longitudinally of the guide rail. The linear bearing assembly, on the other hand, comprises a bearing body having a pair of convergent surfaces opposed to the pair of divergent surfaces of the guide rail. The convergent surfaces have formed thereon a pair of ball raceways of arcuate cross section opposed to the pair of ball raceways on the guide rail. The bearing body also has a pair of ball return passageways extending longitudinally therethrough. Rigidly attached to the opposite ends of the bearing body, a pair of end covers have each formed therein two hairpin grooves each intercommunicating one ball raceway on the bearing body and one adjacent ball return passageway in the bearing body. Thus are formed two closed paths for the recirculation of respective groups of antifriction balls. Each antifriction ball has a radius approximately equal to the radius with which each ball raceway on the guide rail and each ball raceway on the bearing body are curved as viewed cross-sectionally. The linearly bearing assembly further includes a cage for guiding the groups of antifriction balls as they roll between the raceways on the guide rail and the raceways on the bearing body.

In a preferred embodiment the linear bearing apparatus of the above fundamental organization is adapted for use with a table or like object of inverted-U-shaped cross section placed astride a rectilinear support for reciprocating movement thereon. In this application the invention dictates the combined use of a pair of guide rails and at least one pair of recirculating-ball linear bearing assemblies. The guide rails are screwed or otherwise rigidly mounted to the opposite sides of the support, with their divergent surfaces directed away from the support. The linear bearing assemblies are screwed or otherwise rigidly attached to the opposed inside surfaces of the pair of depending aprons of the table, with each linear bearing assembly rollably engaged between the pair of divergent surfaces of one of the guide rails.

Thus the table rolls along the rectilinear support via the four groups of recirculating antifriction balls, with each ball group rollably confined between two opposed raceways on one guide rail and on one bearing body. The angular orientations of the four pairs of opposed raceways are such that the bearing apparatus as a whole can withstand the load forces acting thereon in downward, upward, and opposite lateral directions equally well.

One of the most pronounced features of the invention resides in the fact that the ball paths between the guide rails and the bearing bodies are each bounded by two opposed circular arcs, as viewed cross-sectionally, each arc having a radius approximately equal to the radius of the balls rolling therebetween. Consequently the balls are firmly engaged between the opposed raceways against the possibility of slipping or spinning while being capable of smoothly rolling with the relative longitudinal motion of the bearing bodies and the guide rails. Moreover, when heavily loaded, the balls are elastically deformable only to make contact with the raceways over greater areas. The elastic deformation of the balls is also desirable to assure the satisfactory operation of the apparatus in the face of some dimensional or mounting errors of its components.

The above and other features and advantages of this invention and the manner of attaining them will become more apparent, and the invention itself will best be understood, from a study of the following description of the preferred embodiment and the appended claims, with reference had to the attached drawings.

DESCRIPTION OF THE PREFERRED EMBODIMENT

General

Figure 1:
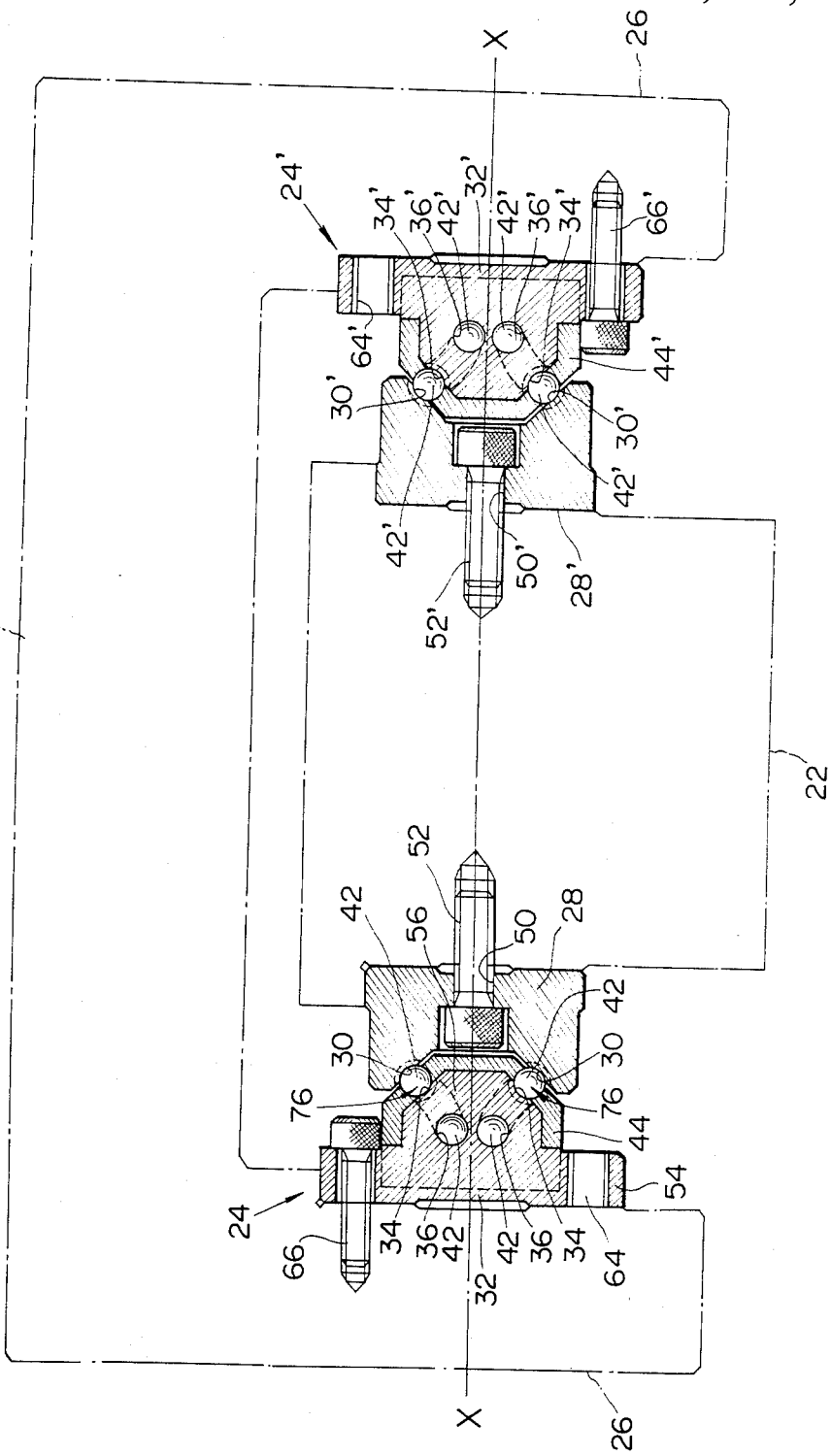
FIG. 1 is a cross section through recirculating-ball linear bearing apparatus constructed in accordance with the invention, the apparatus comprising a pair of guide rails and a pair of linear bearing assemblies for use in frictionlessly moving a table along a rectilinear support.

The above drawings illustrate the recirculating-ball linear bearing apparatus of this invention as adapted for use in frictionlessly moving a table 20 along a fixed rectilinear support 22. In this application the invention dictates the use of one or more pairs of recirculating-ball linear bearing assemblies, generally designated 24 and 24' in FIG. 1, depending in part upon the longitudinal dimension of the table 20 and of the bearing assemblies. It will be assumed for the convenience of description that the apparatus comprises only one pair of linear bearing assemblies 24 and 24' seen in FIG. 1. Overlying the support 22, the table 20 has a pair of depending aprons 26 disposed one on each side of the support.

Reference is first directed to FIGS. 1 to 6 in particular in order to briefly explain the general organization of the illustrated linear bearing apparatus. Broadly the bearing apparatus comprises:

1. A pair of guide rails 28 and 28' fastened to the opposite sides of the rectilinear support 22 so as to extend longitudinally thereof, each guide rail having formed thereon a pair of ball raceways 30, 30' of arcuate cross section extending longitudinally thereof.

2. A pair of bearing bodies 32 and 32' fastened to the inside surfaces of the pair of depending aprons 26 of the table 20, each bearing body having formed thereon a pair of ball raceways 34, 34' extending longitudinally thereof in opposed relation to the pair of ball raceways 30, 30' on one of the guide rails 28 and 28', each bearing body also having a pair of ball return passageways 36, 36' formed longitudinally therethrough.

3. A pair of end covers rigidly mounted on the opposite ends of each bearing body (only the end covers of the left hand bearing body seen at 38 in FIGS. 4 to 6), each end cover having two hairpin grooves 40, FIG. 6, formed in its inside surface each for intercommunicating one ball raceway 34, 34' on the bearing body and one adjacent ball return passageway 36, 36' therein.

4. Four groups of rolling antifriction balls 42 and 42' capable of recirculating through the respective closed ball paths formed by the pairs of raceways 34 and 34' on the bearing bodies 32 and 32', the pairs of return passageways 36 and 36' in the bearing bodies, and the pairs of hairpin grooves 40 in the end covers 38 of the bearing bodies.

5. A pair of segmented cages 44 and 44' formed integral with the respective pairs of end covers 38 and fastened to the respective bearing bodies 32 and 32' for guiding the groups of antifriction balls 42 and 42' as they roll between the raceways 30 and 30' on the guide rails 28 and 28' and the raceways 34 and 34' on the bearing bodies 32 and 32'.

Of the above listed components the pair of bearing bodies 32 and 32', the two pairs of end covers 38, the four groups of antifriction balls 42 and 42', and the pair of cages 44 and 44' make up in combination the two recirculating-ball linear bearing assemblies 24 and 24'. These linear bearing assemblies roll over the respective guide rails 28 and 28' thereby making possible the frictionless travel of the table 20 along the rectilinear support 22 in either direction.

As will be noted upon inspection of FIG. 1, the two guide rails 28 and 28' and the two linear bearing assemblies 24 and 24' are both exactly alike. Only the left hand guide rail 28, and all but the antifriction balls 42 of the listed components of the left hand linear bearing assembly 24, will therefore be described in further detail hereinbelow under the respective headings. The parts of the right hand guide rail 28' and right hand linear bearing assembly 24' will be identified, as necessary, merely by priming the reference numerals used to denote the corresponding parts of the left hand guide rail and left hand linear bearing assembly. The following detailed description presupposes that the support 22 and of course the guide rails 28 and 28' thereon are laid horizontally.

Guide Rail

Figure 2:
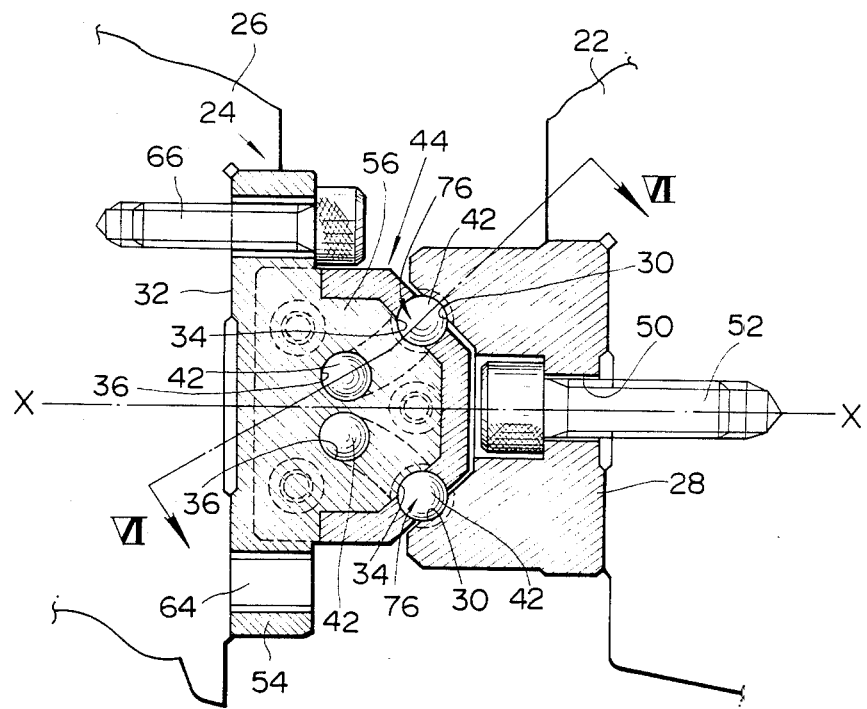
FIG. 2 is an enlarged cross section through the left hand guide rail and left hand linear bearing assembly in the apparatus of FIG. 1.
Figure 3:
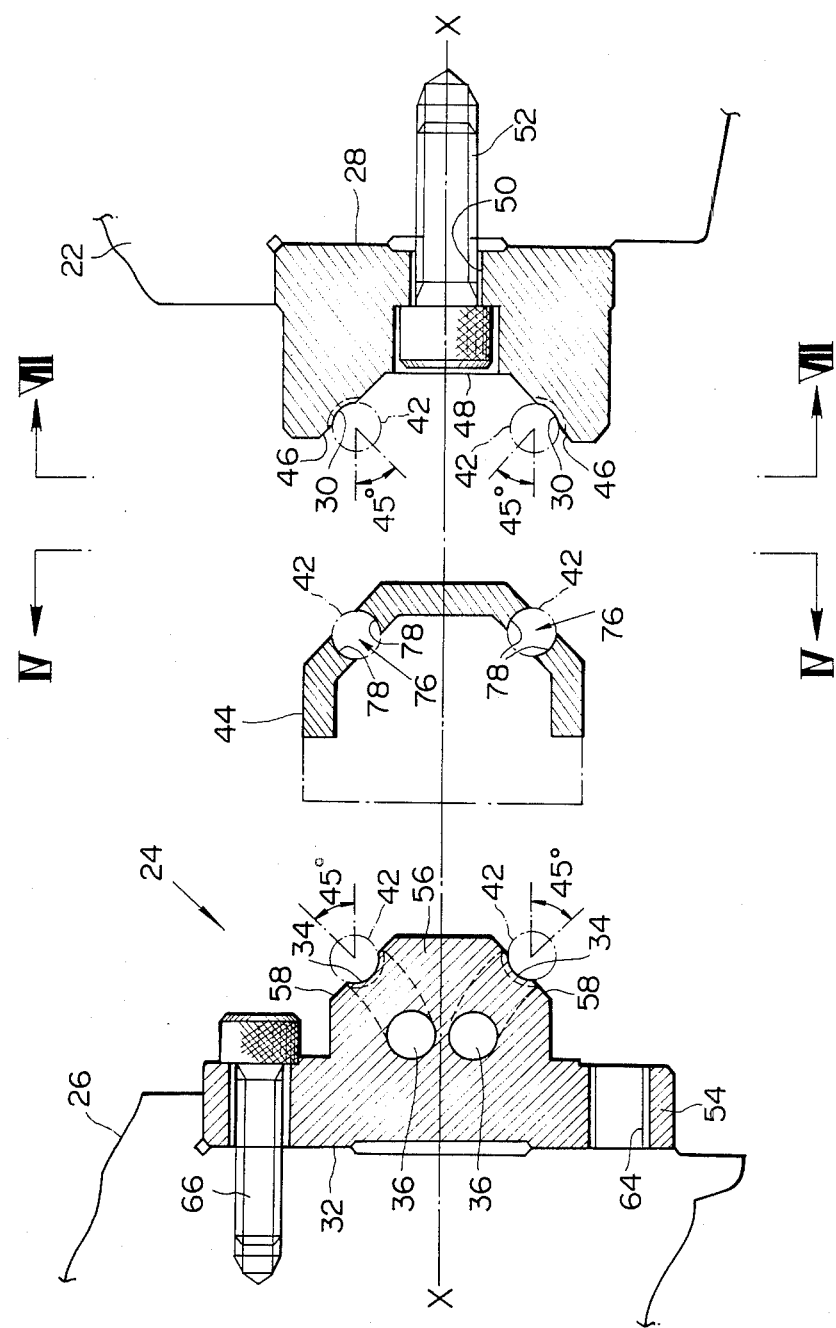
FIG. 3 is a view similar to FIG. 2 except that the guide rail, and the bearing body and cage of the linear bearing assembly, are shown disassembled.
Figure 7:
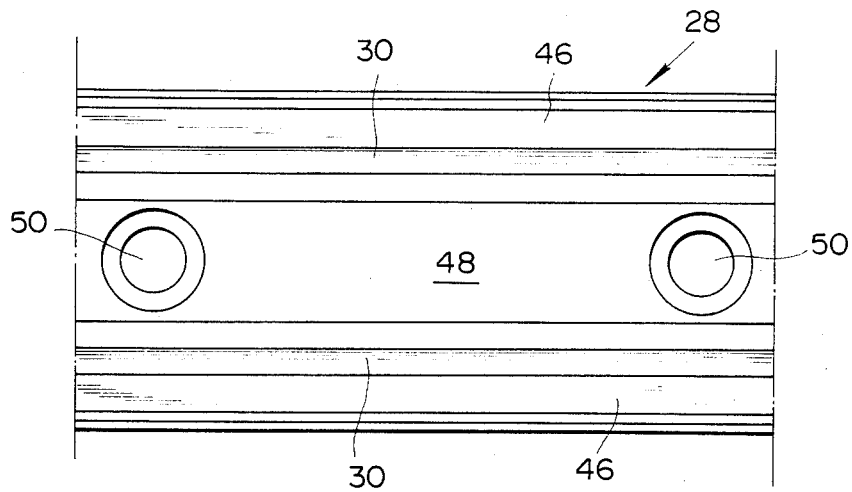
FIG. 7 is a fragmentary elevation of the guide rail as seen in the direction of the arrows VII—VII in FIG. 3.

As seen in FIGS. 1 to 3 and illustrated by itself in FIG. 7, the representative guide rail 28 takes the form of a steel beam of recumbent-U-shaped cross section. It is recessed on its side away from the support 22 to provide, as indicated in FIGS. 3 and 7, a pair of divergent surfaces 46 and a vertical surface 48 intervening therebetween, with the surfaces 46 and 48 extending throughout the length of the guide rail. The pair of divergent surfaces 46 are each at an angle of 45 degrees to the plane of the horizon X—X; that is, the pair of divergent surfaces are angularly spaced 90 degrees from each other.

The horizontal plane X—X is shown in FIGS. 1 to 3 in a position longitudinally bisecting the guide rail 28 and the linear bearing assembly 24. This horizontal plane will again be referred to in the subsequent description of the linear bearing assembly 24.

Formed on the pair of divergent surfaces 46 of the guide rail 28 and extending longitudinally thereof are the pair of ball raceways 30 of arcuate cross section for relative rolling engagement with the respective groups of antifriction balls 42 on the pair of ball raceways 34 on the bearing body 32. As viewed cross-sectionally as in FIGS. 1 to 3, each ball raceway 30 on the guide rail is curved with a radius approximately equal to that of each antifriction ball 42. It will thus be understood from FIG. 3 that the planes passing the longitudinal median lines of the two ball raceways 30 on the guide rail and the centers of the antifriction balls 42 in rolling engagement therewith are each at an angle of 45 degrees to the horizontal plane X—X, or at an angle of 90 degrees to each other.

The pair of raceways 34 on the bearing body 32 are oriented opposite to the pair of raceways 30 on the guide rail 28, as will be later explained in more detail. These angular orientations of the raceways on the guide rail and on the bearing body enable the complete linear bearing apparatus, comprising the pair of bearing assemblies 24 and 24' and the pair of guide rails 28 and 28', to most effectively bear the load on the table 20 acting in all of upward, downward, rightward and leftward directions.

It is understood that the raceways 30 on the guide rail 28 are hardened, as by induction heating and subsequent quenching, for the smooth rolling of the antifriction balls 42 for an extended period of time. The guide rail 28 has any required number of counterbored mounting holes 50 formed in its vertical surface 48 at longitudinal spacings. These mounting holes are intended to pass, for example, cap screws 52 for fastening the guide rail 28 to one of the opposite sides of the support 22.

Bearing Body

Figure 5:
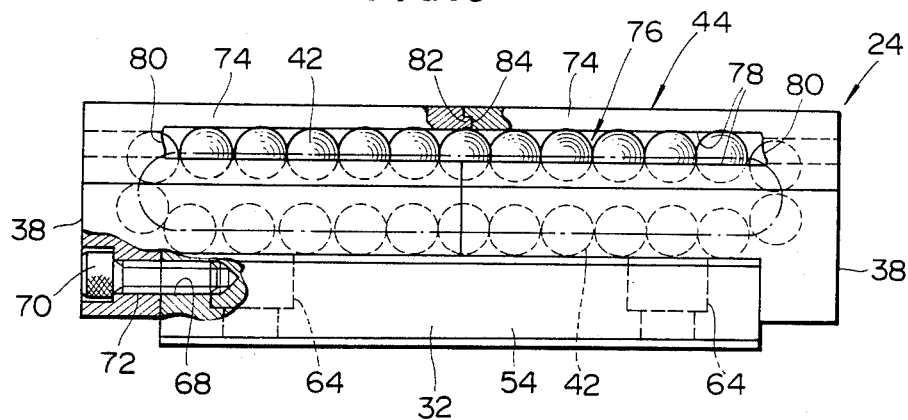
FIG. 5 is a bottom plan, partly sectioned for clarity, of the linear bearing assembly of FIG. 4.
Figure 6:
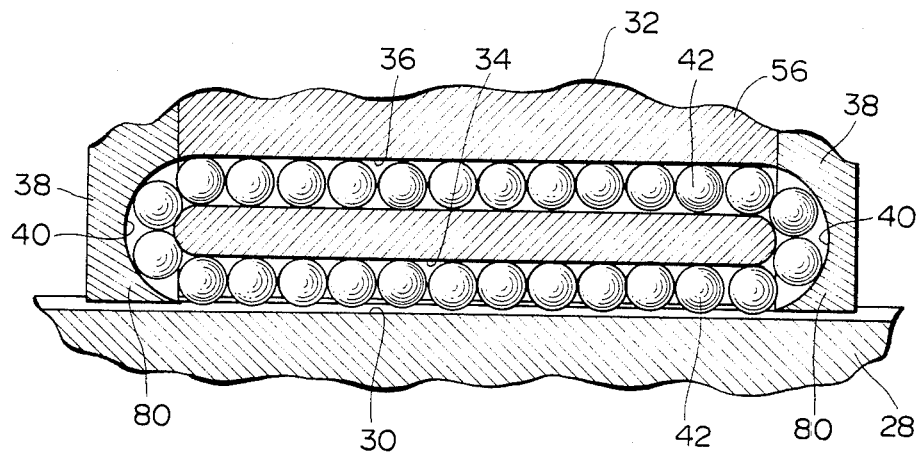
FIG. 6 is a section through the linear bearing assembly, taken along the line VI—VI of FIG. 2, the view showing in particular one of the closed ball paths in the bearing assembly for the recirculation of antifriction balls.
Figure 8:
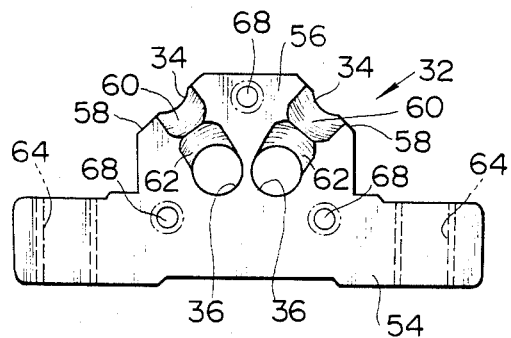
FIG. 8 is an end elevation of the bearing body of the linear bearing assembly shown in FIG. 2.

The bearing body 32 appears in FIGS. 1 to 3, in part in FIGS. 5 to 7, and by itself in FIG. 8. Also made of hardenable steel, the bearing body 32 is in the shape of a recumbent T in cross section. It comprises a mounting flange base 54 held against one of the depending aprons 26 of the tables 20 and a major portion 56 projecting inwardly therefrom. The major portion 56 of the bearing body is shaped to provide a pair of convergent surfaces 58. These convergent surfaces are each of an angle of 45 degrees to the horizontal plane X—X, or at an angle of 90 degrees to each other, and are held opposite to the pair of divergent surfaces 46 of the guide rail 28 across the cage 44.

Formed on the pair of convergent surfaces 58 of the bearing body 32 are the pair of ball raceways 34 extending longitudinally of the bearing body and held opposite to the pair of raceways 30 on the guide rail 28. These raceways on the bearing body are also each curved with a radius approximately equal to the radius of each antifriction ball 42, as viewed cross-sectionally as in FIGS. 1 to 3 or in an end view as in FIG. 8.

Thus, as indicated in FIG. 3, the planes passing the longitudinal median lines of the raceways 34 on the bearing body 32 and the centers of the antifriction balls 42 thereon are each at an angle of 45 degrees to the horizontal plane X—X. The two groups of antifriction balls 42 travel in rolling contact with the raceways 30 on the guide rail 28 and with the raceways 34 on the bearing body. Since the radius of curvature of the cross-sectional shape of all these raceways 30 and 34 is substantially equal to the radius of the antifriction balls 42, each ball normally makes line contact with the two opposed raceways. When the apparatus is loaded in use, the antifriction balls undergo elastic deformation for contact with the raceways 30 and 34 over greater areas, thus effectively transmitting the load from bearing body to guide rail despite the varying directions of load action. The raceways 34 on the bearing body are also hardened as by the induction hardening method.

FIGS. 1 to 3 and 8 clearly reveal the placement of the two ball return passageways 36 extending longitudinally through the bearing body 32, or through its major portion 56. The diameter of each ball return passageway is made somewhat greater than that of each antifriction ball 42 in order that the balls may travel therethrough with minimal frictional resistance. The ball return passageways 36 lie in positions of bilateral symmetry with respect to the horizontal plane X—X.

It should also be noted that the two ball return passageways 36 in the bearing body are arranged very close to each other. Their spacing is considerably less than the spacing between the pair of ball raceways 34 on the bearing body. This arrangement makes it possible to correspondingly reduce the vertical dimension of the major portion 56 of the bearing body without appreciably affecting its strength or rigidity.

As has been mentioned, the pair of ball raceways 34 on the bearing body and the pair of ball return passageways 36 therein are intercommunicated via the two pairs of hairpin grooves 40 in the end covers 38 to provide two closed paths for the recirculation of the respective groups of antifriction balls 42. FIG. 6 best depicts one of the closed ball paths thus formed. As will be seen from this figure, the smooth transition of the balls from the raceways 34 and return passageways 36 to the hairpin grooves 40, and vice versa; is essential for the proper operation of the apparatus. To this end the ball raceways 34 are curved toward the respective return passageways 36 as they approach their opposite extremities, as indicated at 60 in FIG. 8. The ball return passageways 36 also have their opposite end portions curved at 62 toward the respective raceways 34.

Projecting both upwardly and downwardly of the major portion 56 of the bearing body 32, its flange base 54 has mounting holes 64 formed therethrough. Fastener elements such as cap screws 66 pass the mounting holes 64 for rigidly attaching the bearing body 32 to the inside surface of one of the depending aprons 26 of the table 20 as in FIGS. 1 to 3.

Seen at 68 in FIG. 8 are three tapped holes in each end of the bearing body 32. These holes receive threaded fastener elements such as cap screws 70, FIG. 5, by which the end covers 38 are secured to the bearing body. The bearing body has another tapped hole, not seen, formed intermediate its opposite ends for use in screwing the cage 44 thereto.

End Covers

In the illustrated embodiment the pair of end covers 38 are formed integral with the cage 44. More strictly, since the cage 44 is approximately split into a pair of segments, the end covers 38 are integral with the respective cage segments. The end covers and the segmented cage will, however, be described under the separate headings because of the definitely different functions they possess.

Figure 4:
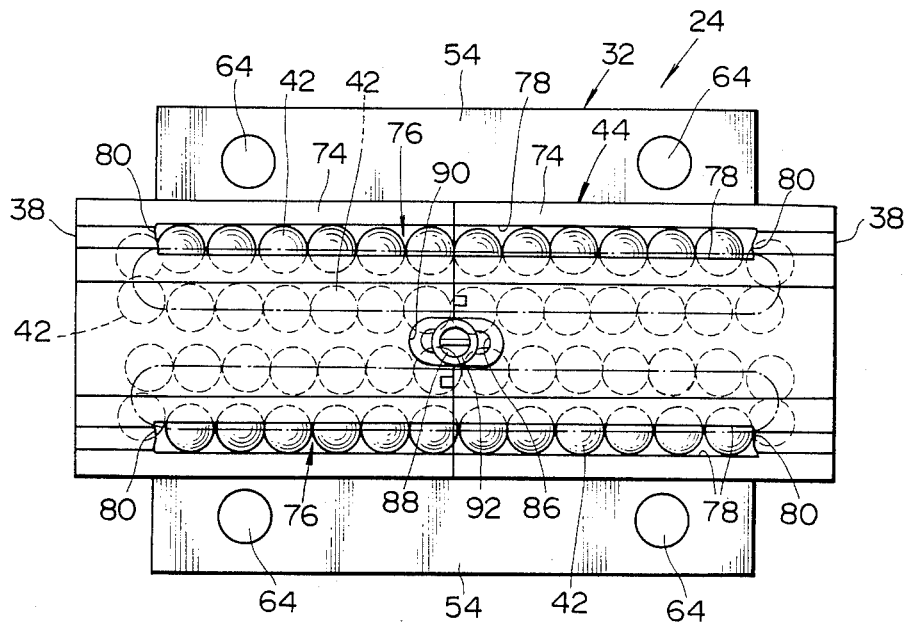
FIG. 4 is an elevation of the linear bearing assembly as seen in the direction of the arrows IV—IV in FIG. 3.
Figure 9:
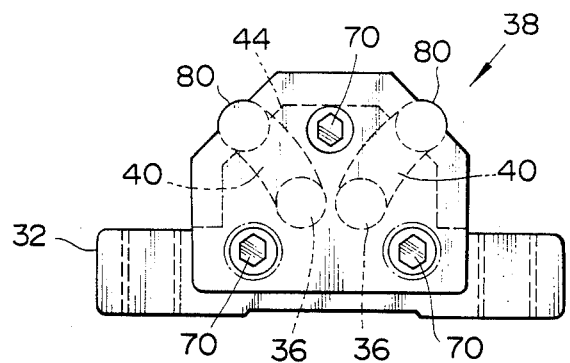
FIG. 9 is an end elevation showing the bearing body of FIG. 8 together with one of the end covers mounted in position thereon.
Figure 10:
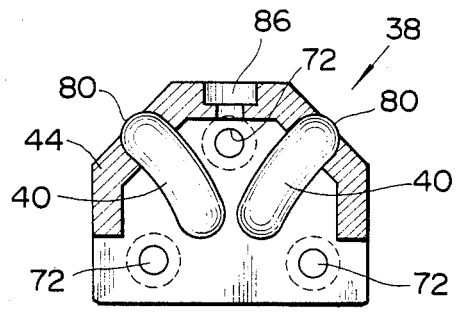
FIG. 10 is an elevation showing the inside surface of the end cover of FIG. 9, the end cover being integral with the cage which is shown in section.

While FIGS. 4 to 6 show the pair of end covers 38 together with other parts, FIGS. 9 and 10 more aptly reveal their organizations. FIG. 9 illustrates the outer surface of one of the end covers 38, together with the bearing body 32 in its position relative to the end cover. FIG. 10 depicts the inner surface of one of the end covers as detached from the bearing body.

Each end cover 38 is shaped and sized to cover at least one end face of the major portion 56 of the bearing body 32, in addition to one end of the cage 44 with which it is integral. Formed in the inner face of the end cover 38, which makes direct contact with the bearing body 32, are the two hairpin grooves 40 intercommunicating the ball raceways 34 on the bearing body and the ball return passageways 36 therein in the manner best pictured in FIG. 6. The hairpin grooves 40 are curved not only in the plane of FIG. 6 but also in a plane at right angles therewith, as in FIGS. 9 and 10. As will be seen also from FIGS. 1 to 3, wherein the hairpin grooves are indicated by the dashed lines, they are bilaterally symmetrical with respect to the horizontal plane X—X and are rather gently convexed toward each other.

Each hairpin groove 40 has its opposite ends in communication with one extremity of one ball raceway 34 on the bearing body and with one extremity of one ball return passageway 36 in the bearing body, thus serving as a hairpin curve therebetween. The other extremities of the ball raceways and the ball return passageways are of course likewise intercommunicated via similar hairpin grooves in the other end cover. Accordingly each ball raceway on the bearing body and one adjacent ball return passageway therein, in combination with two associated hairpin grooves in the end covers, make up in combination a closed path, as in FIG. 6, for the recirculation of one group of antifriction balls.

FIG. 10 shows at 72 three counterbored mounting holes in each end cover 38, one of which is seen also in FIG. 5. The cap screws 70 passing these mounting holes fasten the end cover 38, together with one of the segments of the cage 44 integral therewith, to the bearing body 32.

Cage

The cage 44 is shown in cross section of FIGS. 1 to 3 and in elevations in FIGS. 4 and 5. The cage is transversely split into a pair of segments 74 as in FIGS. 4 and 5. The cage segments are integral with the respective end covers 38 for higher rigidity and the ease with which the cage segment/end cover combinations are mounted in place on the bearing body. Each unitary body of one cage segment and one end cover can be either a die casting, or precision casing, of metal or a molding of rigid plastics.

Taken as a whole, the cage 44 is in the shape of a recumbent U in cross section, dimensioned to fit closely over the major portion 56 of the bearing body 32. Formed longitudinally in the cage 44 are a pair of slots 76 extending along the respective ball raceways 34 on the bearing body 32 and along the respective ball raceways 30 on the guide rail 28.

As indicated in FIGS. 3 to 5, each slot 76 in the cage 44 is defined on both sides by a pair of ball guideways 78 of arcuate cross section. As viewed cross-sectionally as in FIG. 3, the two ball guideways 78 bounding each slot 76 are concentric and are each curved with a radius approximately equal to the radius of each antifriction ball 42. The cage 44 with the guideways 78 functions to confine the antifriction balls 42 and guide them along the raceways 34 on the bearing body and the raceways 30 on the guide rail against the possibility of displacement or dislodgement. The widths of the slots 76 in the cage should therefore be determined with this function of the cage in mind.

As will be seen also from FIGS. 6, 9 and 10, the cage 44, or the pair of end covers 38 integral therewith, are formed to include a pair of tongues 80 at the opposite extremities of each slot 76 in the cage. Projecting toward the guide rail 28, the tongues 80 serve to cause smooth transition of the antifriction balls from the raceways 34 on the bearing body to the hairpin grooves 40 in the end covers and vice versa.

FIG. 5 reveals teeth 82 and grooves 84 formed alternately at the opposed edges of the cage segments 74 for positive engagement with each other. Also, as shown in FIG. 4, a mounting slot 86 is formed centrally in these opposed edges of the cage segments 74. A screw 88 passes the mounting slot 86 for securing the cage segments 74 to the bearing body 32. The mounting slot 86 has a flat-bottomed enlargement 90 for accommodating the head of the screw 88 together with a washer 92.

Assemblage and Mounting

The recirculating-ball linear bearing apparatus of FIG. 1 can be assembled simultaneously with the mounting of its components in place on the table 20 and the support 22. With particular reference to FIG. 1 the pair of guide rails 28 and 28' may first be mounted to the opposite sides of the rectilinear support 22 by means of the screws 52 and 52' passing the counterbored mounting holes 50 and 50' in the guide rails and engaged in tapped holes preformed correspondingly in the support.

The pair of bearing bodies 32 and 32' of the linear bearing assemblies 24 and 24', on the other hand, may be firmly attached to the opposed inside surfaces of the depending aprons 26 of the table 20. The screws 66 and 66' are used for thus mounting the bearing bodies to the table, with the screws passing the mounting holes 64 and 64' in the flange bases of the bearing bodies and engaged in tapped holes preformed in prescribed positions in the table aprons. Then the table 20 with the bearing bodies 32 thereon may be placed astraddle over the support 22, in such a position that the bearing bodies lie opposite to the respective guide rails 28 and 28'. Required numbers of the antifriction balls 42 and 42' may now be filled in the return passageways 36 and 36' in the bearing bodies 32 and 32'.

Prior to mounting the cages 44 and 44', complete with the end covers, on the bearing bodies 32 and 32' on the table 20, some of the remainders of the antifriction balls may be filled in the slots 76 in one of the segments of each cage and in the hairpin grooves 40 in the end cover integral therewith. These cage segment/end cover combinations, with the antifriction balls filled in their slots and hairpin grooves, may be placed over the major portions of the bearing bodies 32 and 32' by being slid into the spaces between bearing bodies and guide rails from either end of the bearing bodies. The rest of the antifriction balls may likewise be filled in the slots 76 in the other of the segments of each cage and in the hairpin grooves 40 in the end cover integral therewith. These cage segment/end cover combinations may then be placed over the major portions of the bearing bodies 32 and 32' to establish the mating interengagement of the teeth 82 and grooves 84 at the opposed edges of the cage segments.

Next comes the step of fastening the cage segment/end cover combinations to the bearing bodies 32 and 32'. The screw 88, FIG. 4, may be inserted in the mounting slot 86 in each cage via the washer 92. The screws 70, FIGS. 5 and 9, may also be inserted in the three mounting holes 72 in the end cover 38 at each end of each cage. The inserted screws 70 and 88 may be tightened after making sure that the cage segment/end cover combinations are in position on the bearing bodies.

Now are completed the assemblage and mounting of the linear bearing apparatus of FIG. 1. It will be seen that the antifriction balls 42 and 42' in the slots of the cages 44 and 44' make rolling engagement both with the raceways 30 and 30' on the guide rails 28 and 28' and with the raceways 34 and 34' on the bearing bodies 32 and 32'.

Operation

While the operation of the recirculating-ball linear bearing apparatus in accordance with the invention is believed to be largely apparent from the foregoing, further amplification will be made in the following brief summary of such operation. As the table 20 travels in either direction along the fixed rectilinear support 22, so do, of course, the pair of linear bearing assemblies 24 and 24' along the pair of guide rails 28 and 28'. With the movement of the linear bearing assemblies the four groups of antifriction balls 42 and 42' roll between the raceways 34 and 34' on the bearing bodies 32 and 32' and the raceways 30 and 30' on the guide rails 28 and 28'. The guideways 78 on the cages 44 and 44' guide the movement of the antifriction balls between bearing bodies and guide rails.

At the trailing ends of the bearing bodies the tongues 80 of the cages or the end covers direct the successive antifriction balls 42 and 42' into the hairpin grooves 40 in one of the end covers 38 of each bearing assembly. The load on the bearing apparatus is no longer transmitted to the balls as they flow into the hairpin grooves.

The antifriction balls 42 and 42' subsequently enter the return passageways 36 and 36' in the bearing bodies 32 and 32' and travel therethrough in the same direction as the traveling direction of the bearing assemblies relative to the guide rails. Then, via the hairpin grooves 40 in the end covers at the leading ends of the bearing bodies, the balls reenter the spaces between the raceways 34 and 34' on the bearing bodies and the raceways 30 and 30' on the guide rails, again bearing the load on the bearing apparatus.

Thus, with the travel of the linear bearing assemblies 24 and 24' along the guide rails 28 and 28', the four groups of antifriction balls 42 and 42' constantly recirculate along the respective closed paths formed by the raceways 34 and 34' on the bearing bodies and the raceways 30 and 30' on the guide rails, the hairpin grooves 40 in the end covers, and the return passageways 36 and 36' in the bearing bodies. The direction in which the balls roll along these closed path is of course subject to change depending upon the traveling direction of the bearing assemblies 24 and 24' along the guide rails 28 and 28'.

Figure 11:
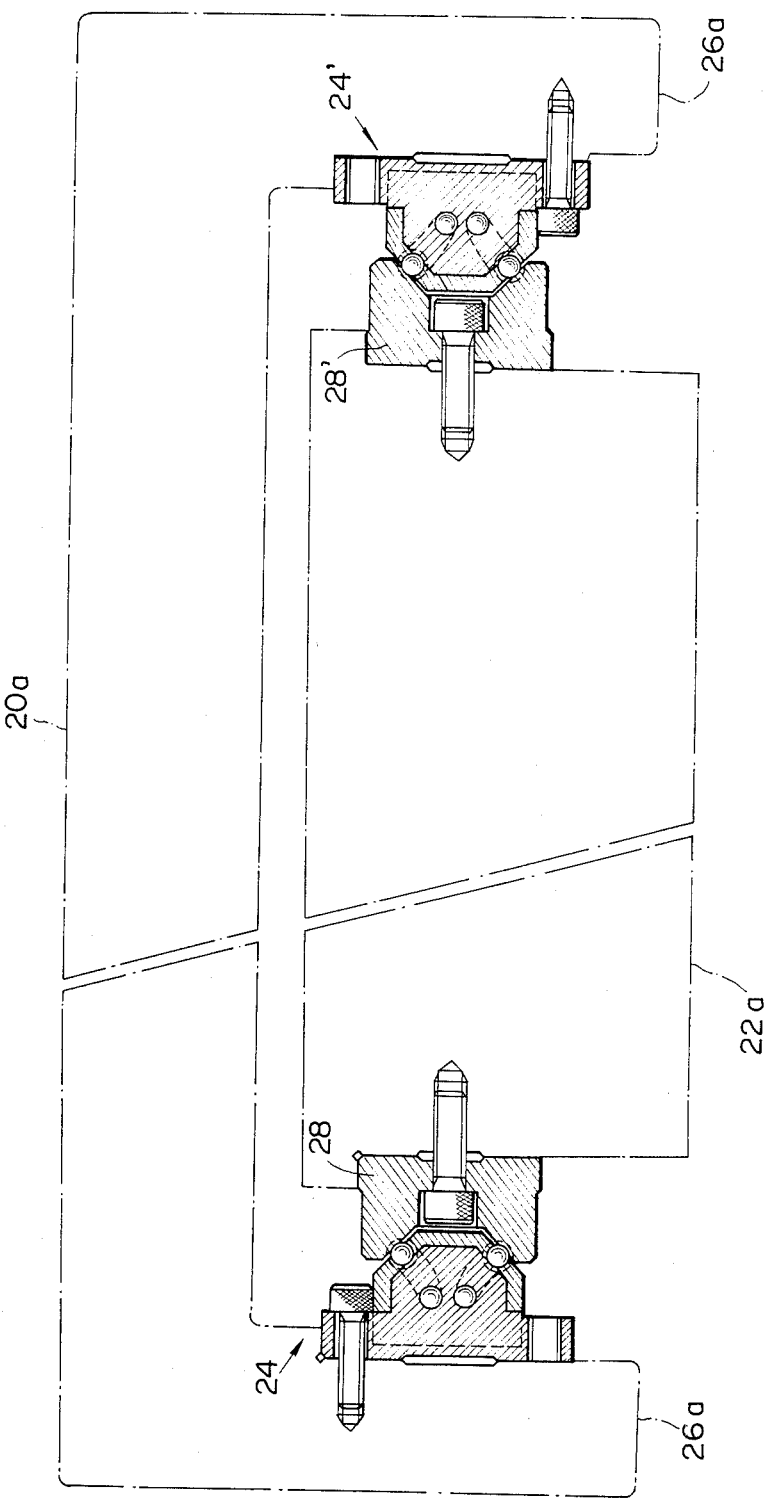
FIG. 11 is a view similar to FIG. 1 except that the pair of guide rails and the pair of linear bearing assemblies are put to use with a table and support of greater widths.

FIG. 11 is intended to demonstrate one of the advantages offered by the linear bearing apparatus of this invention. As has been stated in conjunction with FIG. 1, the apparatus presupposes the use of at least one pair of linear bearing assemblies in combination with a pair of guide rails to make it possible for an object of inverted-U-shaped cross section to move frictionlessly along a fixed rectilinear support. Thus the pair of bearing assemblies 24 and 24' and pair of guide rails 28 and 28' of FIG. 1 find use with a table 20a and support 22a, FIG. 11, of much greater widths than those of the table 20 and support 22 of FIG. 1. The bearing assemblies are screwed to the pair of depending aprons 26a of the table 20a whereas the guide rails are likewise fastened to the opposite sides of the support 22a. No alteration whatever of the parts of the apparatus is required for thus using the bearing assemblies and guide rails with tables and supports of different widths.

Other advantages gained by the invention will have become apparent from the foregoing detailed disclosure. It will, of course, be understood that various changes may be made in the form, details, arrangements and proportions of the parts to conform to specific requirements of use and to design preferences, without departing from the scope of the invention as expressed in the following claims.

What is claimed is:

1. A recirculating-ball linear bearing apparatus for use in moving an object along a rectilinear path with a minimum of friction, comprising:
   a guide rail having a pair of divergent surfaces formed longitudinally thereon, the divergent surfaces each having a raceway formed thereon of arcuate cross section extending longitudinally of the guide rail;
   a bearing body having a pair of convergent surfaces opposed to the pair of divergent surfaces of said guide rail, the convergent surfaces each having a raceway formed thereon of arcuate cross section extending longitudinally of the bearing body in opposed relation to one of the raceways on the guide rail, the bearing body also having a pair of return passageways extending longitudinally therethrough;
   a pair of end covers at the opposite ends of the bearing body each having formed therein two hairpin grooves each intercommunicating one raceway on the bearing body and one return passageway in the bearing body;
   rolling balls capable of recirculating through respective closed paths comprising the raceways on the bearing body, the return passageways in the bearing body, and the hairpin grooves in the end covers, the balls while rolling along the raceways on the bearing body also making rolling engagement with the raceways on the guide rail to allow the bearing body to travel along the guide rail; and
   a cage integral with said pair of end covers and disposed on the bearing body for guiding the rolling balls as they roll between the raceways on the bearing body and the raceways on the guide rail, and the cage being transversely split into a pair of segments, such that
   (a) a line of contact of each ball with respect to the associated raceways in opposed relation on the bearing body and on the guide rail converges toward the inside of the bearing body at an angle approximately 45 degrees with respect to a longitudinal central plane between the raceways on the bearing body; and
   (b) the return passages in the bearing body are positioned close to the longitudinal central plane in a manner such that they are disposed near the contact line of each ball and such that the hairpin grooves in each cover do not cross the longitudinal central plane.

2. The recirculating-ball linear bearing apparatus as recited in claim 1, wherein the pair of divergent surfaces of the guide rail and the pair of convergent surfaces of the bearing both are both angularly spaced 90 degrees from each other.

3. The recirculating-ball linear bearing apparatus as recited in claim 1, wherein the pair of return passageways in the bearing body are spaced close to each other than are the pair of raceways on the bearing body.

4. The recirculating-ball linear bearing apparatus as recited in claim 1, wherein the bearing body is formed to include a mounting flange base.

5. The recirculating-ball linear bearing apparatus as recited in claim 1, wherein the cage has formed therein a pair of slots for rollably confining therein the respective groups of antifriction balls as they roll between the raceways on the bearing body and the raceways on the guide rail.

6. The recirculating-ball linear bearing apparatus as recited in claim 5, wherein each slot in the cage is defined by a pair of opposed ball guideways each curved, as viewed cross-sectionally, with a radius approximately equal to the radius of each antifriction ball.

7. The recirculating-ball linear bearing apparatus as recited in claim 5, wherein the cage is formed to include a pair of tongues at the opposite extremities of each slot therein for the smooth transfer of the antifriction balls between the corresponding one of the raceways on the bearing body and the associated ones of the hairpin grooves in the end covers.

8. The recirculating-ball linear bearing apparatus as recited in claim 5, wherein the cage is shaped to fit over the bearing body.

9. The recirculating-ball linear bearing apparatus as recited in claim 1, wherein the pair of segments of the cage have opposed edges adapted for positive engagement with each other.

* * * * *